June 1, 1943.  A. C. HAGG  2,320,927
THRUST BEARING MEANS
Filed April 30, 1941

INVENTOR
Arthur C. Hagg.
BY O.B.Buchanan
ATTORNEY

Patented June 1, 1943

2,320,927

UNITED STATES PATENT OFFICE 2,320,927

THRUST-BEARING MEANS

Arthur C. Hagg, Wilkinsburg, Pa., assignor to Westinghouse Electric & Manufacturing Company, East Pittsburgh, Pa., a corporation of Pennsylvania Application April 30, 1941, Serial No. 391,048

3 Claims. (Cl. 308—170)

My invention relates to rotating assemblies, particularly high-speed assemblies such as are utilized in spinning-operations, or in twisting thread, and high-speed apparatus for other purposes. The invention was particularly designed for a high-speed flexible-shaft assembly which is driven above its critical speeds, and in which the flexible shaft or spindle is laterally restrained, at one point, by a diaphragm which substantially prevents lateral movement but which permits a slight tilting movement or angular displacement of the flexible shaft, the outer rim of the diaphragm being carried by a hollow-shaft or quill-type rotor-motor which is supported in stationary, non-tilting bearings, the bottom end of the flexible shaft being rotatably mounted within a damping means which permits a certain amount of radial displacement with damping. My invention has particular relation to a novel type of thrust bearing, or a combined thrust and guide bearing, which is particularly adapted to meet the special problems which are encountered in very high-speed apparatus.

My invention is particularly adapted for high-speed apparatus, although it is not necessarily limited thereto.

An object of my invention is to provide a thrust bearing which is particularly adapted to high-speed applications of some 5,000 to 100,000 revolutions per minute, having thrust-bearing surfaces of small diameters, such as from 1½ inches diameter down to ⅛ inch diameter, or for some lower-speed applications at somewhat larger diameters. More specifically, my invention relates to such thrust-bearing surfaces in which a wedge-shaped film of oil is provided, thickest near the shaft and thinnest at or near the outer periphery of the thrust-bearing surfaces, whereby I am enabled to obtain a wedge-shaped oil-film the oil-flow path of which provides a hydrodynamic adjustment, in response to variations in thrust-loads and speeds, as distinguished from mechanical adjustments such as have been obtained in some previous thrust-bearing designs having mechanically tiltable plates for the thrust-bearing surfaces.

While my invention is not necessarily limited thereto, it was more particularly designed for use in the rotating-assembly which is described and claimed in an application of F. C. Rushing, Serial No. 391,086, filed April 30, 1941, which is, in turn, an improvement over the rotating assembly shown in the Baker et al. Patent 2,147,420, granted February 14, 1939, both assigned to the Westinghouse Electric & Manufacturing Company.

Figure 1:
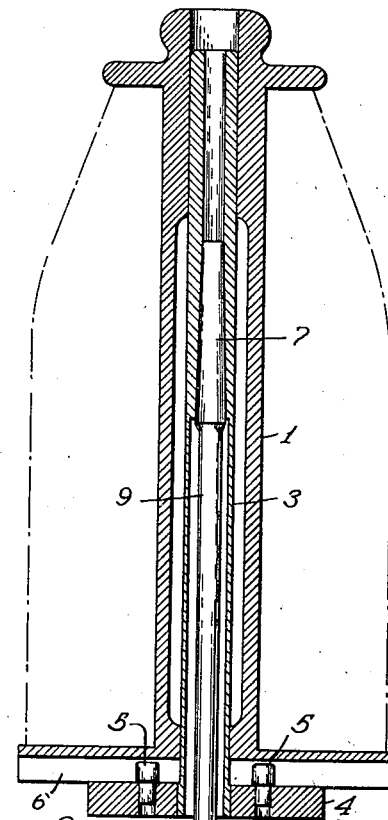
Figure 1:
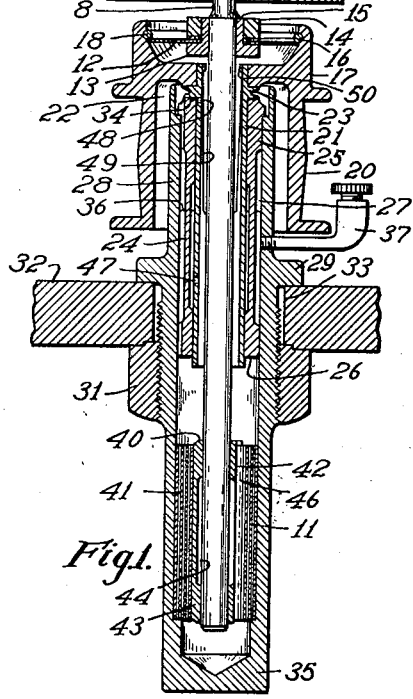
Figure 2:
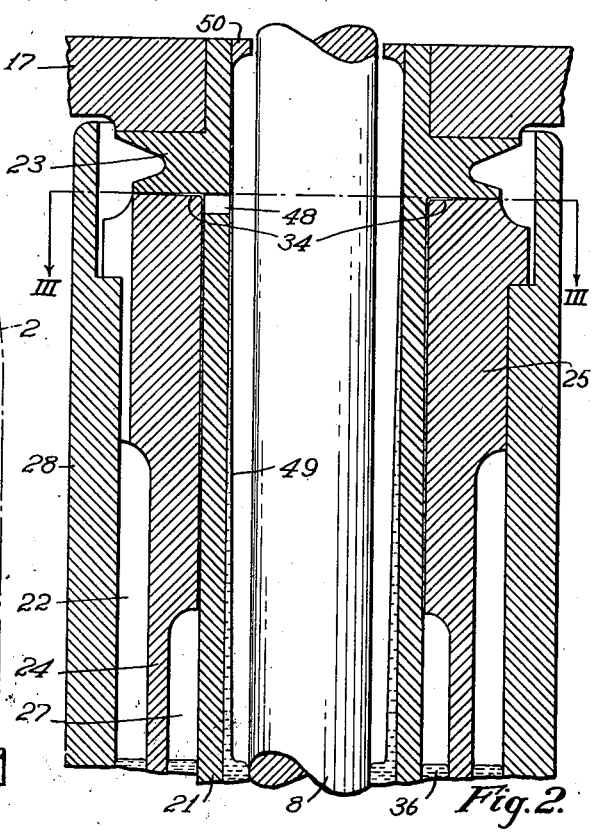
Figure 3:
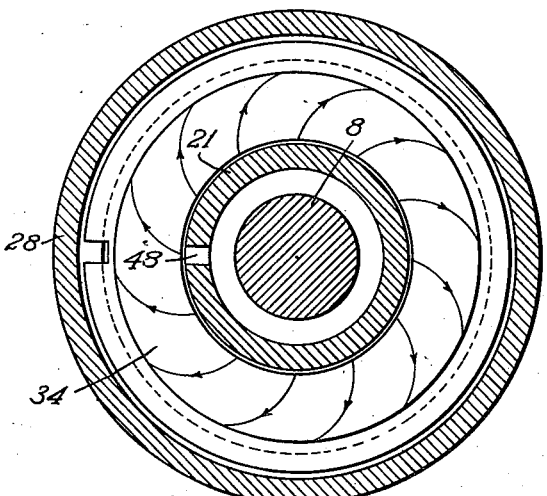

With the foregoing and other objects in view, my invention consists in the apparatus, combinations, parts, systems and methods hereinafter described and claimed, and illustrated in the accompanying drawing, wherein Figure 1 is a longitudinal vertical sectional view of a belt-driven bolster for a high-speed thread-twisting apparatus, embodying my invention in a preferred form of embodiment, the horizontal dimensions being somewhat exaggerated, relative to the vertical dimensions, for clarity of illustration;

Fig. 2 is an enlarged sectional detail of the thrust-bearing which is shown in Fig. 1; and Fig. 3 is an enlarged transverse sectional view illustrating the oil-movement in the thrust-bearing oil-film, the sectional plane being indicated by the line III—III in Fig. 2.

Fig. 1 shows a belt-driven bolster for supporting a pirn 1, or unloaded shell or spool which is rotated at high speed in the process of twisting thread which is wound thereon to form a package 2. The pirn 1 is mounted on an adaptor 3 which may be provided with an enlarged mass 4 on its lower end, in a manner similar to that described in the Baker et al. patent. The lower flange or mass 4 of the adaptor is provided with driving-pins 5 which enter into a keying groove or grooves 6 in the bottom of the pirn for causing the pirn to rotate with the adaptor. The adaptor 3 is mounted on the tapered top end 7 of a long vertical flexible shaft or spindle 8, the upper portion of which, just below its tapering top end 7, is of reduced diameter, as indicated at 9, for the purpose of providing more flexibility at this portion of the spindle.

The spindle 8 must be restrained against radial or lateral movement or translation at some intermediate point, but it must also be so mounted that it has some small freedom of angular movement or adjustment at this point, so that the lower end of the spindle may move laterally in a damper 11 which will be subsequently described. As set forth in the aforesaid Rushing application, the lateral restraint of the spindle 8, at an intermediate point, is provided by a diaphragm 12 or other equivalent means for substantially preventing radial movement of the spindle at this point, while permitting a certain amount of hinging movement or angular deflection. The diaphragm 12 may be made of clock-spring steel, or it may be any flexible member, not necessarily resilient, although a resilient material is desirable in having a centering influence tending to keep this spindle "centered" or preventing it from tilting over, slightly, in the standstill position of the device. The diaphragm 12 is centered on the spindle 8, at an intermediate point of the latter, by any suitable means, such as two collars 13 and 14, the collar 13 being a hub-like shoulder-collar which is pressed on the spindle 8, and the collar 14 being a clamping-ring which is pressed onto a reduced portion 15 of the hub-collar 13, so as to firmly engage the center of the diaphragm 12 between the two collars. Preferably, some yieldable material 16 is interposed between the two collars, on one or both sides of the diaphragm 12. This yieldable material 16 may be a fish-paper gasket, a spring washer, or any other means which will hold the diaphragm substantially tight on the spindle 8.

The outer rim of the diaphragm 12 is carried by the rotor-member 17 through which the high-speed assembly is driven. Any suitable means may be provided for securing the outer periphery of the diaphragm 12 to the rotor-member 17, the illustrated means including a snap-spring 18 which tightly holds the diaphragm in place, with sufficient friction to provide a non-slipping driving-connection for rotating the spindle 8 from the rotor-member 17, through the diaphragm 12.

In the form of my invention shown in Fig. 1 the rotor-member 17 comprises a belt-pulley 20 which is adapted to be driven by a belt (not shown).

The belt-pulley 20 is mounted on, or integral with, a hollow shaft or quill 21 which surrounds the intermediate portion of the flexible spindle 8 in spaced relation thereto. In the form of construction shown in Fig. 1, the upper portion of the pulley 20, immediately below the diaphragm 12, is joined to the top end of the hollow shaft 21, and the pulley-proper is itself hollow, so as to provide an inverted-cup construction, providing an annular space 22 between the pulley 20 and the top half of the quill 21. Into this annular space 22 projects the top end of a fixed bearing-assembly which will now be described.

The top end of the hollow shaft or quill 21, immediately below the point where the top portion of the hollow pulley 20 is joined to the quill, is enlarged to provide a rotating annular thrust-bearing member or runner 23 which is carried by the rotating hollow shaft 21. Surrounding the hollow shaft 21 underneath the runner 23 is a journal or guide bearing constituting the main bearing 24 of the entire high-speed assembly, as described and claimed in the aforesaid Rushing application. The main bearing 24 is in the form of a common cylindrical stationary bearing-housing for an upper main bearing 25 and a lower main bearing 26, with an annular space 27 therebetween.

The main bearing-housing 24 is stationarily supported in a cylindrical supporting-frame 28 which is provided with an external shoulder-member 29 and a nut 31, between which a rigid horizontal supporting-member 32 is clamped the frame 28 extending through a hole 33 in the support 32.

The upper end of the upper main bearing 25 constitutes a solid stationary annular thrust-bearing member, the top surface of which co-operates with the bottom surface of the solid runner 23 to provide the two thrust-supporting surfaces of a thrust-bearing 34. In accordance with my present invention, the two thrust-supporting thrust-bearing surfaces of both of the annular thrust-bearing members 23 and 25 are substantially continuous both circumferentially and radially, and these surfaces have a small slope, relative to each other, from all points around the outer circumference toward the shaft. Thus, as shown in Fig. 2, the annular bottom-surface of the top member 23 may be a portion of a horizontal plane, while the annular top-surface of the upper main bearing 25 has a small slope toward the center so as to provide a conical wedge-shaped oil-film between the two thrust-bearing surfaces 34, with the thick part of the wedge toward the hollow shaft 21.

The lower end of the hollow shaft 21 terminates shortly below the lower main bearing 26, but the flexible spindle 8 extends down a considerable distance further, and the cylindrical supporting-frame extends down still further than the spindle 8 and terminates in a closed bottom end 35 which constitutes the bottom of an oil-reservoir, in which oil is maintained at a suitable oil-level 36 at some intermediate point along the height of the hollow shaft or quill 21. An oil-filler 37 is shown, for maintaining the oil-level 36.

The lower end of the spindle 8 has a certain amount of lateral movement or whipping, as the spindle tilts or inclines slightly in its diaphragm 12, under certain transient operating-conditions as will subsequently be described. A combined guide-bearing and damping-means is provided for this lower end of the spindle 8, in the form of a non-rotating damper-bearing 40, which surrounds the spindle near the lower end thereof, and a non-rotating damping-means 41 which surrounds the damper-bearing 40 and nests in the lower end of the cylindrical supporting-frame 28.

The damper-bearing 40 is in the form of a common cylindrical non-rotating bearing-housing for an upper damper-bearing 42 and a lower damper-bearing 43, with an annular space 44 therebetween.

The particular form of damping-means 41 which is shown in Fig. 1 is an improved element more particularly described and claimed in my aforesaid companion-application. The damping means 41 of Fig. 1 comprises a non-rotating, loosely coiled, spirally wound strip surrounding the spindle near the lower end thereof, and comprising a plurality of spaced convolutions. The inner loop of the spiral damper 41 presses against the damper-bearing 40 and may be keyed thereto by means of an axially extending slot 46 in the damper-bearing housing, to prevent rotation of the damper-bearing. The outer loop of the spiral damper 41 presses against the cylindrical supporting-frame 28 with a force which has been found sufficient to prevent rotation of the spiral. The combined damper-bearing 40 and damper 41 is immersed in the oil 36 which is contained in the cylindrical supporting-frame 28. The spirally wound damper-strip 41 may be a mild steel, not necessarily spring-steel, or it may be copper, or it may even be a substantially non-resilient material.

The particular lubricating-means which is shown in Fig. 1 is an improved element which is more particularly described in my aforesaid companion-application. The damper-bearing 40, being immersed in oil, requires no further lubrication-means than the natural movement of oil which occurs during the operation of the device. The main bearing 24 is lubricated mainly by one or more oil-ducts 47 through the wall of the hollow shaft 21 at such a height as to discharge oil, under considerable centrifugal pressure, into the annular space 27 between the upper and lower main-bearings 25 and 26, causing oil to pass upward through the upper main-bearing 25 and downward through the lower main-bearing 26.

The thrust-bearing 34 is lubricated by the oil which is discharged from the upper end of the upper main-bearing, and preferably also by a supplemental oiling-means in the form of one or more oil-ducts 48 which may be drilled through the wall of the hollow shaft 21 at about the level of the thrust-bearing 34. These thrust-bearing ducts 48 are above the normal oil-level 36 in the cylindrical supporting-frame 28, and are supplied with oil from an oil-layer or film 49, which climbs up along the inner surface of the hollow shaft 21 by reason of the whirling of the oil caused by the rotation of said hollow shaft. This inner oil-film 49 inside of the hollow shaft 21 may be prevented from discharging out of the upper end of the hollow shaft by means of an annular projection or lip 50 on the inside of the hollow-shaft at a height above the oil-ducts 48, for limiting the rise of said film 49 on the inside diameter of the hollow shaft 21.

The operation of the high-speed assembly shown in Fig. 1 is as follows. The horizontal supporting-member 32 firmly holds the vertical cylindrical supporting-frame 28 with rigid restraint against movement of any kind. The main bearings 24, being centered in the cylindrical supporting-frame 28, thus restrains the driving-rotor member against radial lateral-translation and also against tilting movements, said driving-rotor member comprising the hollow-shaft or quill 21 and the driving pulley 20 or other means for imparting a rotating-torque to the flexible spindle 8. The diaphragm 12, being centered in the rotor-member, restrains the flexible spindle 8 from any radial movement or lateral translation at the intermediate point thereof where said diaphragm is attached, but the flexibility of the diaphragm permits the spindle to have a certain amount of tilting-movement about said intermediate point under certain critical-speed conditions, as will now be described.

The high-speed assembly constitutes a spring-system consisting principally of a driven mass to be rotated, mounted on the top end of a flexible spindle which is restrained against lateral translation at an intermediate point, but which has some resiliently restrained freedom of tilting-movements at said intermediate point, a relatively small mass at the lower end of the spindle, and a damping-means near the lower end of the spindle, for permitting the lower end of the spindle to rotate with some freedom of lateral displacement, but damping such lateral displacement, near said lower end. In the form of embodiment shown in Fig. 1, the resilience of the diaphragm 12 and the resilience of the spiral damper 41 also contribute to the spring-system by tending to "center" the spindle in its vertical, non-tilted position.

In this spring-system, the driven mass, which is rotated or to be rotated, at a high speed, at the top of the flexible spindle 8, consists of a non-varying portion in the form of the adapter 3, which is in place on the spindle under all normal operating-conditions of the high-speed assembly, and a variable-mass portion in the form of the detachable pirn 1 and a variable amount of thread 2 which is contained thereon in various stages of the thread-twisting operation. The package consisting of the pirn 1 and thread 2 is subject to a certain amount of uncontrollable and variable unbalance, which tends to produce a whipping of the spindle 8, and a centrifugal force-reaction in the main bearings 24; and the damped spring-system shown in Fig. 1 operates to prevent any considerable part of these force-reactions from being transmitted to the main bearings 24, and through them to the supporting-structure 32.

The spindle 8 is preferably, although not necessarily, of a reduced diameter between the diaphragm 12 and the adapter 3, as indicated at 9, so as to be more flexible in this portion than at the lower end between the diaphragm 12 and the damper 41.

The thrust-bearing 34 is lubricated jointly by the oil which is discharged upwardly from the upper main bearing 25, and by oil which is delivered centrifugally from the oil-ducts 48, thus providing a wedge-shaped film of oil between the two thrust-bearing surfaces, with the thick part of the wedge disposed toward the hollow shaft 21. An inclination or slope of 0.3° between the two surfaces of this thrust-bearing wedge has given good performance over a wide range of loads and speeds, and electrical-conductivity tests have demonstrated there is no metal-to-metal contact at the thrust-bearing 34. I do not consider that I am limited, however, to this particular precise slope, which may be varied between the limits of 0.1° and 1°, more or less.

The wedge-shaped oil-film in the thrust-bearing 34 is particularly applicable to thrust-bearings for shafts which rotate at an extremely high speed such as 10,000 R. P. M., or from 5,000 to 100,000 R. P. M., where the centrifugal forces are particularly high, and where the ordinary type of thrust-bearing having mechanically tiltable shoes encounters difficulties due to the extremely large centrifugal force tending to expel oil too rapidly from the outer periphery of the thrust-bearing.

According to my design, I provide two solid annular thrust-bearing members, namely the rotating member or runner 23 which is carried by the shaft, and a stationary member 25 which surrounds the shaft and is carried by the support 28—32, thereby avoiding the loss in thrust-bearing area and the mechanical difficulties which would be involved in providing a plurality of separately tiltable thrust-bearing shoes. My design is particularly adapted, moreover, to a thrust-bearing design in which, because of the extremely high speeds of operation, it is necessary to limit the outer diameter of the thrust-bearing to a value of the order of ⅞", or from ⅛" to 1½" outer diameter, in order to limit the centrifugal forces which are involved.

The oil-flow lines, in the oil-wedge of my thrust-bearing 34, are indicated in Fig. 3, from which it can be seen that the oil flows, in curved lines, from the center out into the thin part of the wedge near the outer periphery of the thrust-bearing. The curvature of these oil-flow lines is self-adjustable, thus automatically effecting a hydro-dynamic adjustment which allows the wedge-shaped oil-film to adjust itself to variations in speed and loading, thus taking full advantage of the centrifugal force as well as the tangential shearing force, in creating and maintaining the wedge-shaped oil-film. By this means, I avoid the necessity for a mechanical adjustment of the slope of the wedge-shaped films, as is necessary in the tilting-shoe type of thrust-bearing.

I claim as my invention:

1. A thrust-bearing for a rotatable shaft, comprising, in combination with the shaft, a support therefor, and lubricating means therefor, two solid annular thrust-bearing members, one of said members being a rotating member carried by the shaft, and the other member being a stationary member surrounding the shaft and carried by the support, the thrust-supporting thrust-bearing surfaces of both of said annular thrust-bearing members being substantially continuous circumferentially and radially, and having a small slope, relative to each other, from all points around the outer circumference toward the center so as to provide a conical wedge-shaped thrust-supporting film of lubricant between the two thrust-bearing surfaces, with the thick part of the wedge toward the shaft.

2. A thrust-bearing assembly for a rotatable vertical hollow shaft, comprising, in combination: the rotatable vertical hollow shaft, an oil-reservoir into which said shaft dips, whereby the rotation of the hollow shaft raises a film of oil on its inside diameter, two solid annular thrust-bearing members, one of said members being a rotating member carried by the hollow shaft and constituting an enlargement of its outside diameter at that point, and the other annular thrust-bearing member being a stationary supporting-member surrounding said hollow shaft, one or more oil-ducts through the wall of the hollow shaft for tapping the oil-film on the inside diameter of the hollow shaft at a point above the oil-level in the reservoir and for discharging said oil substantially at the level of the thrust-bearing surfaces, the thrust-supporting thrust-bearing surfaces of both of said annular thrust-bearing members being substantially continuous circumferentially and radially, and having a small slope, relative to each other, from all points around the outer circumference toward the center so as to provide a conical wedge-shaped thrust-supporting film of lubricant between the two thrust-bearing surfaces, with the thick part of the wedge toward the hollow shaft.

3. A thrust-bearing assembly for a rotatable hollow shaft, comprising, in combination: the rotatable hollow shaft, two solid annular thrust-bearing members, one of said members being a rotating member carried by the hollow shaft and constituting an enlargement of its outside diameter at that point, and the other annular thrust-bearing member being a stationary supporting-member surrounding said hollow shaft, means for providing an oil-supply to the inside of said hollow shaft, and one or more oil-ducts through the wall of the hollow shaft for supplying oil to the outside of the hollow shaft and thence to the thrust-bearing surfaces, the thrust-supporting thrust-bearing surfaces of both of said annular thrust-bearing members being substantially continuous circumferentially and radially, and having a small slope, relative to each other, from all points around the outer circumference toward the center so as to provide a conical wedge-shaped thrust-supporting film of oil between the two thrust-bearing surfaces, with the thick part of the wedge toward the hollow shaft.

ARTHUR C. HAGG.